United States Patent
Nishida

(10) Patent No.: US 8,279,453 B2
(45) Date of Patent: Oct. 2, 2012

(54) METHOD AND DEVICE FOR MEASURING THICKNESS OF MULTILAYER FILM

(75) Inventor: Kazufumi Nishida, Tokyo (JP)

(73) Assignee: Yokogawa Electric Corporation, Tokyo (JP)

(*) Notice: Subject to any disclaimer, the term of this patent is extended or adjusted under 35 U.S.C. 154(b) by 48 days.

(21) Appl. No.: 12/915,372

(22) Filed: Oct. 29, 2010

(65) Prior Publication Data

US 2011/0102812 A1    May 5, 2011

(30) Foreign Application Priority Data

Oct. 30, 2009   (JP) ................. 2009-250260

(51) Int. Cl.
*G01B 11/06* (2006.01)
(52) U.S. Cl. ...................... 356/632; 356/630
(58) Field of Classification Search .......... 356/625–636, 356/300, 450–451, 492–498, 481, 517, 503, 356/504; 250/559.27
See application file for complete search history.

(56) References Cited

U.S. PATENT DOCUMENTS

| 5,587,792 A | 12/1996 | Nishizawa et al. |
| 2007/0008549 A1 | 1/2007 | Jeong et al. |
| 2008/0266550 A1 | 10/2008 | Nishida et al. |

FOREIGN PATENT DOCUMENTS

| JP | 2005-308394 A | 11/2005 |
| JP | 2008-292473 A | 12/2008 |

OTHER PUBLICATIONS

Extended European Search Report issued on Feb. 14, 2011 in the corresponding European Patent Application No. 10189336.0.

*Primary Examiner* — Tri T Ton
(74) *Attorney, Agent, or Firm* — Sughrue Mion, PLLC

(57) ABSTRACT

There is provided a method of measuring a physical thickness of each of layers of a multilayer film, based on an optical thickness thereof. The method includes: (a) setting refractive indexes of the layers; (b) calculating a coefficient matrix using the refractive indexes; (c) providing light to the multilayer film so as to measure the optical thickness based on the light reflected by the multilayer film; and (d) calculating the physical thickness, based on the optical thickness and the coefficient matrix.

8 Claims, 6 Drawing Sheets

FIG. 3A

| No. | WAVELENGTH RANGE | | OPTICAL THICKNESS DETECTION RANGE | |
|---|---|---|---|---|
| L1 | 500 | 900 | 3.0 | 5.0 |

| No. | WAVELENGTH RANGE | | OPTICAL THICKNESS DETECTION RANGE | |
|---|---|---|---|---|
| L2 | 500 | 900 | 10.0 | 15.0 |

| No. | WAVELENGTH RANGE | | OPTICAL THICKNESS DETECTION RANGE | |
|---|---|---|---|---|
| L3 | 800 | 900 | 110.0 | 120.0 |

OPTICAL THICKNESS DETECTION SET VALUE INPUT SCREEN

FIG. 3B

|  | L1 | L2 | L3 |
|---|---|---|---|
| D1 | 1.52 | 1.52 | 1.48 |
| D2 | 0.00 | 1.42 | 1.40 |
| D3 | 0.00 | 0.00 | 1.61 |

REFRACTIVE INDEX INPUT SCREEN

FIG. 3C

|  | D1 | D2 | D3 |
|---|---|---|---|
| L1 | 1.52 | 0.00 | 0.00 |
| L2 | 1.52 | 1.42 | 0.00 |
| L3 | 1.48 | 1.40 | 1.61 |

REFRACTIVE INDEX INPUT SCREEN

METHOD AND DEVICE FOR MEASURING THICKNESS OF MULTILAYER FILM

This application claims priority from Japanese Patent Application No. 2009-250260, filed on Oct. 30, 2009, the entire contents of which are herein incorporated by reference.

BACKGROUND

1. Technical Field

The present disclosure relates to a method and device capable of measuring the thicknesses of various kinds of multilayer films.

2. Related Art

FIG. 5 shows the structure of a film thickness meter that measures the thickness of a multilayer film. In FIG. 5, white light emitted from a light source 11 is provided to a multilayer film 10 through an optical fiber 12. The light reflected by the multilayer film 10 is guided to a spectroscope 13 through the optical fiber 12.

The spectroscope 13 disperses the reflected light, converts the dispersed light into an electric signal, and generates a spectrum. The spectrum is acquired by a spectral data acquiring unit 14 and is then output to an optical thickness calculator 15.

A setting unit 16 sets a wavelength band for measuring the optical thickness and a peak detection range for detecting the peak of a power spectrum.

Frequency interference fringes that are proportional to the optical thickness appear in the spectrum. The optical thickness calculator 15 measures the interference fringes and calculates the optical thickness.

For the wavelength band set by the setting unit 16, a reflectance spectrum is converted into a wavenumber domain reflectance spectrum in which the wavelength is arranged at equal intervals. Then, Fourier transform is performed on the data of the wavenumber domain reflectance spectrum to calculate the power spectrum in the set wavelength band. The peak of the power spectrum is detected in the peak detection range set by the setting unit 16. The optical thickness is obtained from the position of the peak.

The optical thickness calculated by the optical thickness calculator 15 is input to a physical thickness calculator 17. The physical thickness calculator 17 calculates the physical thickness, which is the actual film thickness, of each layer of the multilayer film 10, based on the optical thickness and the refractive index. The physical thickness is displayed on a display unit 18.

Next, the relationship between the optical thickness and the physical thickness will be described with reference to FIG. 6. FIG. 6 is a cross-sectional view illustrating the multilayer film. The multilayer film includes two layers 20 and 21, and the physical thicknesses of the two layers 20 and 21 are d11 and d12, respectively. The layer 21 is a film and the layer 20 is a coating layer formed on the film 21. The physical thicknesses d11 and d12 of the layers 20 and 21 are 1 µm and 150 µm, respectively.

It is assumed that white light enters from the layer 20 so that the film thickness is measured. The light is reflected from the boundary surface between the layers 20 and 21 and the rear surface of the multilayer film, and the optical thickness is obtained from the reflected light. The optical thickness obtained from the light reflected by the boundary surface between the layers 20 and 21 is L11 and the optical thickness obtained from the light reflected by the rear surface of the multilayer film is L12. The optical thickness L11 relates to only the layer 20, but the optical thickness L12 relates to both the layer 20 and the layer 21.

Ideally, it is possible to measure the optical thicknesses corresponding to the number of combinations of the boundary surfaces of the multilayer film. However, since the optical thickness that can be actually measured depends on the reflectance or flatness of each boundary surface, it is not necessarily possible to directly detect the optical thickness of the desired layer.

The optical thickness is the product of the physical thickness and the refractive index. Therefore, when the optical thickness of the desired layer can be directly measured, it is possible to calculate the physical thickness with a simple operation. However, when it is difficult to directly measure the optical thickness of the desired layer, an expression for obtaining the physical thickness needs to be derived from a combination of the optical thicknesses of a plurality of layers.

JP-A-2008-292473 discloses an example in which the optical thickness is measured in a plurality of wavelength ranges using the relationship between the wavelength and the refractive index depending on the wavelength, which makes it possible to independently measure the physical thickness of each layer even though a plurality of layers have the same film thickness. The above-mentioned example will be now described with reference to the multilayer film shown in FIG. 6.

When the refractive indexes of the layer 20 in the wavelength ranges W1 and W2 are n11 and n12 and the refractive indexes of the layer 21 in the wavelength ranges W1 and W2 are n21 and n22, the following Expressions (1) and (2) are given. Also, the optical thickness L12 is the sum of the optical thicknesses of the layers 20 and 21:

$$d11 = L11/n11 \quad (1)$$

$$d12 = (L12 - d11 \times n12)/n22 \quad (2)$$
$$= (L12 - L11/n11 \times n12)/n22$$

As shown in FIG. 6, d11 and d12 are the physical thicknesses, and L11 and L12 are the optical thicknesses. The optical thickness L12 relates to both the layer 20 and the layer 21. Therefore, d11 needs to be calculated by Expression (1) and d11 needs to be substituted into Expression (2) to calculate d12.

It is possible to calculate the physical thicknesses d11 and d12 from Expressions (1) and (2) and the measured values of the optical thicknesses L11 and L12.

However, the film thickness meter has the following problems. Expressions (1) and (2) depend on the optical thickness that can be measured or the structure of the multilayer film to be measured. However, it is difficult for the user to know in advance a difference in the refractive index due to the wavelength and derive an expression for calculating the physical thickness from the optical thickness. Even when the user can derive the expression, it is difficult to prepare a structure in which the film thickness meter receives any type of arithmetic expression.

In order to solve the above-mentioned problems, all expressions for calculating the physical thickness from the optical thickness need to be installed into the film thickness meter in advance. However, since it is difficult to install all arithmetic expressions, the individual arithmetic expression needs to be installed in accordance with each customer's request. Therefore, it takes a lot of time and effort to calculate the physical thickness.

In addition, since it is necessary to measure a multilayer film of a different brand after the device is delivered, it is difficult for the user to respond to the circumstances, and the film thickness meter needs to be redesigned.

SUMMARY OF THE INVENTION

Exemplary embodiments of the present invention address the above disadvantages and other disadvantages not described above. However, the present invention is not required to overcome the disadvantages described above, and thus, an exemplary embodiment of the present invention may not overcome any disadvantages According to one or more illustrative aspects of the invention, there is provided a method of measuring a physical thickness of each of layers of a multilayer film, based on an optical thickness thereof. The method includes: (a) setting refractive indexes of the layers; (b) calculating a coefficient matrix using the refractive indexes; (c) providing light to the multilayer film so as to measure the optical thickness based on the light reflected by the multilayer film; and (d) calculating the physical thickness, based on the optical thickness and the coefficient matrix.

According to one or more illustrative aspects of the invention, there is provided a device that measures a physical thickness of each of layers of a multilayer film, based on an optical thickness thereof. The device includes: an optical thickness measuring unit configured to provide light to the multilayer film so as to measure the optical thickness based on the light reflected by the multilayer film; a refractive index setting unit configured to set refractive indexes of the layers; a coefficient matrix calculator configured to calculate a coefficient matrix using the refractive indexes; and a physical thickness calculator configured to calculate the physical thickness based on the optical thickness and the coefficient matrix.

Other aspects and advantages of the present invention will be apparent from the following description, the drawings and the claims.

BRIEF DESCRIPTION OF THE DRAWINGS

FIGS. 3A to 3C are diagrams illustrating an optical thickness detection setting screen and a refractive index setting screen;

DETAILED DESCRIPTION OF EXEMPLARY EMBODIMENTS

Figure 1:
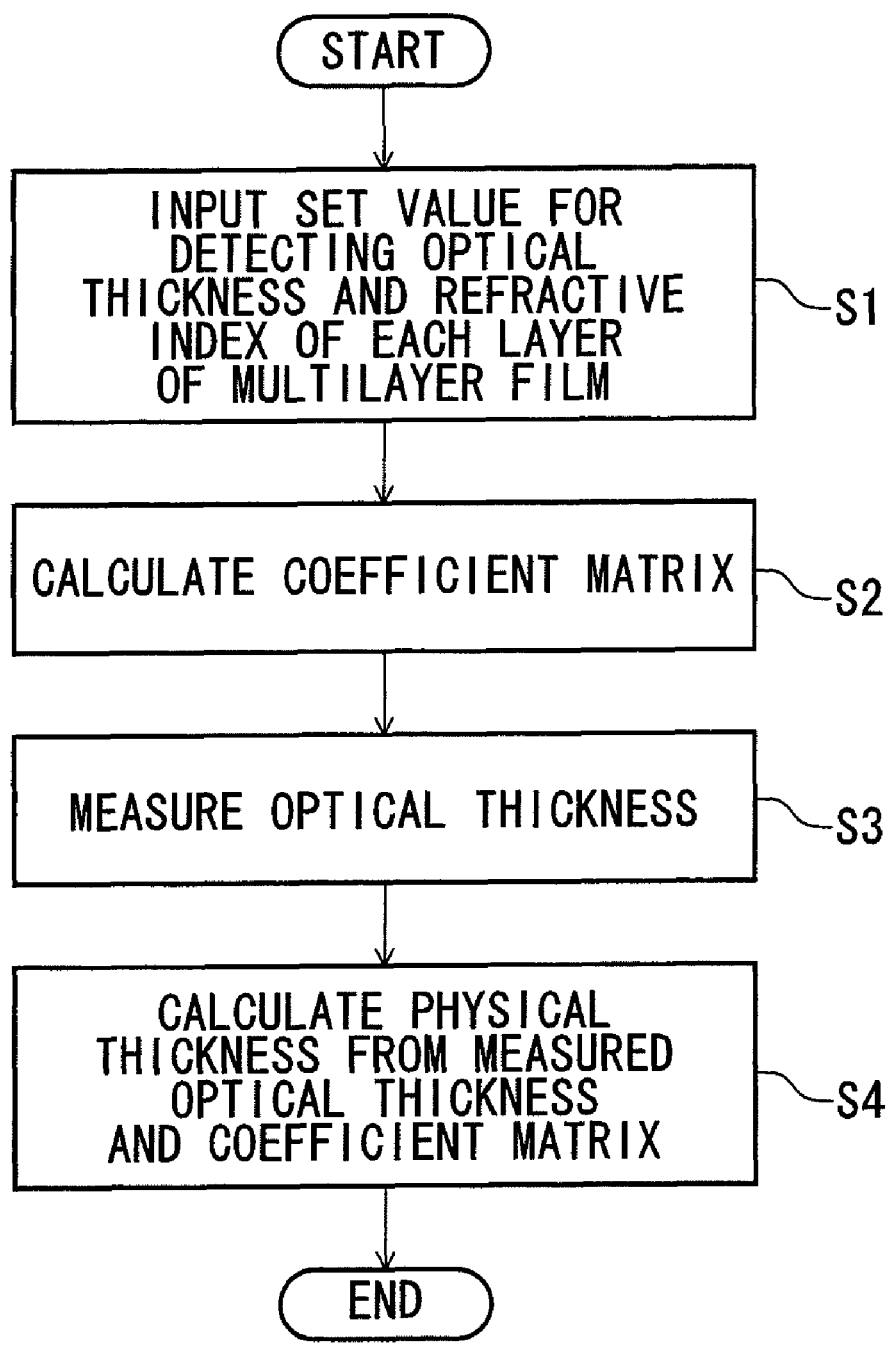
FIG. 1 is a flowchart illustrating an embodiment of the invention.

Hereinafter, exemplary embodiments of the invention will be described in detail with reference to the accompanying drawings. FIG. 1 is a flowchart illustrating a method of measuring the thickness of a multilayer film according to an embodiment of the invention. A preliminary measuring process is performed to determine an optical thickness to be measured. The number of optical thicknesses to be measured is equal to the number of layers of the multilayer film.

In FIG. 1, in step S1, a set value for detecting the optical thickness and the refractive index of each layer of the multilayer film are input. The input of the set value and the refractive index will be described below.

Then, in step S2, the input refractive index is used to calculate a coefficient matrix for calculating a physical thickness from the optical thickness. The coefficient matrix is used to calculate the physical thickness from the optical thickness.

Then, in step S3, the optical thickness is measured by the same method as that in the related art. That is, white light is provided to the multilayer film, and light reflected by the multilayer film is dispersed to obtain a spectrum. The spectrum is converted into a wavenumber domain reflectance spectrum in which the wavelength is arranged at equal intervals, and Fourier transform is performed on the data of the wavenumber domain reflectance spectrum to calculate the power spectrum in the set wavelength band. Then, the peak of the power spectrum is detected in the peak detection range input in the step S1, and the optical thickness is calculated from the position of the peak.

Then, in step S4, the physical thickness is calculated from the measured optical thickness and the coefficient matrix calculated in the step S2.

Figure 2:
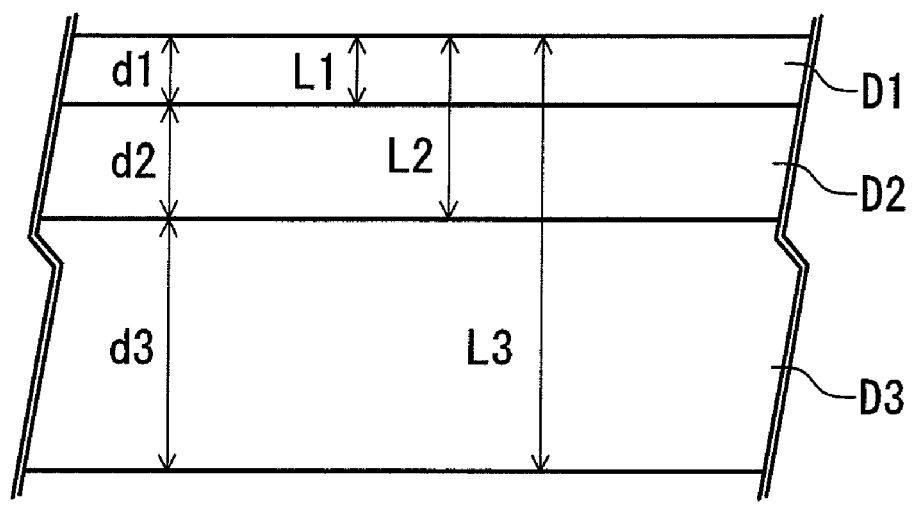
FIG. 2 is a cross-sectional view illustrating a multilayer film.

Next, this embodiment will be described in more detail. FIG. 2 is a cross-sectional view illustrating the multilayer film to be measured. In FIG. 2, D1 to D3 are respective layers forming the multilayer film, and d1 to d3 are the respective physical thicknesses of the layers D1 to D3. The multilayer film includes three layers D1 to D3. The layers D1 to D3 are, for example, plastic films or coating layers on the film.

L1 to L3 are the measured optical thicknesses. The optical thickness L1 is obtained by measuring interference fringes generated by the interference between light reflected from a front surface of the multilayer film and light reflected from the boundary surface between the layers D1 and D2. The optical thickness L2 is obtained by measuring interference fringes generated by the interference between the light reflected from the front surface of the multilayer film and light reflected from the boundary surface between D2 and D3. The optical thickness L3 is obtained by measuring interference fringes generated by the interference between the light reflected from the front surface of the multilayer film and light reflected from a rear surface of the multilayer film.

The optical thickness L1 relates to only the layer D1, and the optical thickness L2 relates to the layers D1 and D2. The optical thickness L3 relates to all of the layers D1 to D3.

FIGS. 3A to 3C show input screens for data that is input in the step S1. FIG. 3A shows a set value input screen for detecting the optical thickness. FIGS. 3B and 3C show a refractive index input screen.

As shown in FIG. 3A, in order to detect the optical thickness, a wavelength range (left side) for measuring the optical thickness and an optical thickness search range (right side) for searching for the peak of the power spectrum are input for each of the optical thicknesses L1 to L3. In this embodiment, the wavelength range of the optical thicknesses L1 and L2 is set in a range of 500 nm to 900 nm, and the wavelength range of the optical thickness L3 is set in a range of 800 nm to 900 nm. Since the refractive indexes of the layers D1 to D3 depend on the optical thicknesses, the wavelength range of the optical thickness L3 is different from that of the other optical thicknesses.

The optical thickness search ranges are set in a range of 3.0 to 5.0, 10.0 to 15.0, and 110.0 to 120.0 for the optical thicknesses L1 to L3, respectively. The wavelength range and the optical thickness search range are set for each multilayer film such that the optical thickness can be accurately measured. The entire range may be a target range without setting the wavelength range and the optical thickness search range.

FIG. 3B shows a screen for inputting the refractive indexes of the layers D1 to D3. Rows D1 to D3 correspond to the layers D1 and D3 and columns L1 to L3 correspond to the optical thicknesses L1 to L3, respectively. The refractive index in the wavelength range set in the optical thickness detection value input screen shown in FIG. 3A is input to an input field at the intersection between the row and the column. The refractive index of the layer that does not relate to each optical thickness is zero. In this way, the sensitivity of each optical thickness with respect to each layer is set.

In FIG. 2, since the optical thickness L1 relates to only the layer D1, the refractive index, 1.52, of the layer D1 at a wavelength of 500 nm to 900 nm is input to the input field at the intersection between D1 and L1, and 0.00 is input to the input fields at the intersections between D2 and D3, and L1.

The optical thickness L2 relates to the layers D1 and D2, but does not relate to the layer D3. Therefore, 1.52 (which is equal to the value input to the input field at the intersection between D1 and L1) is input to the input field at the intersection between D1 and L2, and the refractive index, 1.42, of the layer D2 at a wavelength of 500 nm to 900 nm is input to the input field at the intersection between D2 and L2. 0.00 is input to the input field at the intersection between D3 and L2.

The optical thickness L3 relates to all of the layers D1 to D3. The refractive indexes, 1.48, 1.40, and 1.61, of the layers D1 to D3 at a wavelength of 800 nm to 900 nm are input to the input fields at the intersections between L3 and D1 to D3, respectively.

When the physical thicknesses of the layers D1 to D3 are d1 to d3, Expressions (3) to (5) are given as follows since the optical thickness is obtained by multiplying the physical thickness by the refractive index:

$$L1 = 1.52 \times d1 \quad (3)$$

$$L2 = 1.52 \times d1 + 1.42 \times d2 \quad (4)$$

$$L3 = 1.48 \times d1 + 1.4 \times d2 + 1.61 \times d3 \quad (5)$$

When a column vector having the physical thicknesses d1 to d3 as components is $\underline{D}$, a column vector having the optical thicknesses L1 to L3 as components is $\underline{L}$, and a transposed matrix of the refractive index input to the input screen shown in FIG. 2B is n, Expression (6) is given as follows.

$$\underline{D} = \begin{pmatrix} d1 \\ d2 \\ d3 \end{pmatrix} \quad \underline{L} = \begin{pmatrix} L1 \\ L2 \\ L3 \end{pmatrix} \quad n = \begin{bmatrix} 1.52 & 0.0 & 0.0 \\ 1.52 & 1.42 & 0.0 \\ 1.48 & 1.40 & 1.60 \end{bmatrix} \quad (6)$$

From Expressions (3) to (6), Expression (7) is given as follows:

$$\underline{L} = n\underline{D} \quad (7)$$

When Expression (7) is transformed, Expression (8) is obtained as follows:

$$\underline{D} = n^{-1}\underline{L} \quad (8)$$

where $n^{-1}$ is an inverse matrix of the matrix n.

It is possible to calculate the physical thickness from the optical thickness using Expression (8). The inverse matrix $n^{-1}$ is a coefficient matrix for calculating the physical thickness from the optical thickness.

In this embodiment, since the layers D1 to D3 are rows and the optical thicknesses L1 to L3 are columns in the refractive index input screen, the matrix of the refractive index is transposed. However, as shown in FIG. 3C, when the input screen in which the row and the column are interchanged is used, it is not necessary to transpose the matrix. An inverse matrix of the matrix n may be calculated using an input value as the matrix n.

The refractive index is not necessarily input using the screen shown in FIG. 3B or 3C. The refractive index of the layer related to each optical thickness and the refractive index of each layer in the set wavelength range may be input to generate the matrix n represented by Expression (6).

Figure 6:
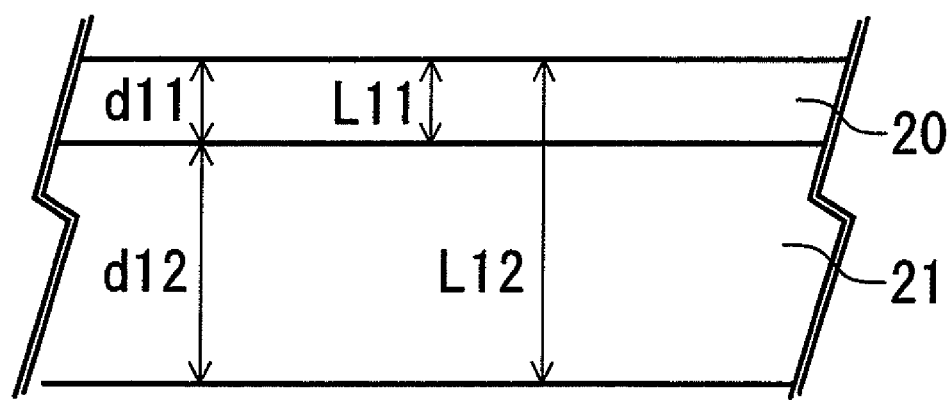
FIG. 6 is a cross-sectional view illustrating a multilayer film.

It is possible to calculate the physical thickness of a two-layer film using the same method as described above. When the refractive indexes of layers 20 and 21 in a two-layer film shown in FIG. 6 are n11 and n12, respectively, Expression (9) is obtained as follows.

$$\underline{L} = \begin{pmatrix} L11 \\ L12 \end{pmatrix} = n\underline{D} = \begin{bmatrix} n11 & 0.0 \\ n11 & n22 \end{bmatrix} \begin{pmatrix} d11 \\ d12 \end{pmatrix} \quad (9)$$

When the inverse matrix of the matrix n is calculated and Expression (9) is transformed, Expression (10) is obtained as follows, and it is possible to calculate the physical thicknesses d11 and d12 from the optical thicknesses L11 and L12 and the refractive indexes n11 and n22.

$$\underline{D} = \begin{pmatrix} d11 \\ d12 \end{pmatrix} = \begin{bmatrix} 1/n11 & 0 \\ -1/(n11*n22) & 1/n22 \end{bmatrix} \begin{pmatrix} L11 \\ L12 \end{pmatrix} \quad (10)$$

This relationship may be extended to a multilayer film including four or more layers. When the multilayer film includes N layers, the physical thicknesses of the N layers are d1, d2, ..., dN, and the optical thicknesses are L1, L2, ..., LN, Expression (11) is given as follows since the optical thickness is represented by the product of the refractive index and the physical thickness:

$$L1 = \alpha 11 \times d1 + \alpha 12 \times d2 + \ldots + \alpha 1N \times dN$$

$$L2 = \alpha 21 \times d1 + \alpha 22 \times d2 + \ldots + \alpha 2N \times dN$$

$$LN = \alpha N1 \times d1 + \alpha N2 \times d2 + \ldots + \alpha NN \times dN. \quad (11)$$

where $\alpha 11, \ldots, \alpha NN$ are the refractive indexes of each layer and are input by the method described in FIGS. 3B and 3C. Also, $\alpha ij$ is the refractive index of a layer j related to an optical thickness i.

When the optical thickness and the physical thickness are represented by a column vector, Expression (11) can be rearranged into the following Expression (12).

$$\begin{pmatrix} L1 \\ L2 \\ \vdots \\ LN \end{pmatrix} = \begin{bmatrix} \alpha 11 & \alpha 12 & \ldots & \alpha 1N \\ \alpha 21 & \alpha 22 & \ldots & \alpha 2N \\ \vdots & \vdots & \vdots & \vdots \\ \alpha N1 & \alpha N2 & \ldots & \alpha NN \end{bmatrix} \begin{pmatrix} d1 \\ d2 \\ \vdots \\ dN \end{pmatrix} \quad (12)$$

When the inverse matrix of the matrix [αij] is [βij], Expression (12) may be transformed into the following Expression (13), and it is possible to calculate the physical thicknesses d1, d2, ..., dN from the optical thicknesses L1, L2, ..., LN. The matrix [βij] is a coefficient matrix for calculating the physical thickness from the optical thickness.

$$\begin{pmatrix} d1 \\ d2 \\ \vdots \\ dN \end{pmatrix} = \begin{bmatrix} \beta 11 & \beta 12 & \cdots & \beta 1N \\ \beta 21 & \beta 22 & \cdots & \beta 2N \\ \vdots & \vdots & \vdots & \vdots \\ \beta N1 & \beta N2 & \cdots & \beta NN \end{bmatrix} \begin{pmatrix} L1 \\ L2 \\ \vdots \\ LN \end{pmatrix} \quad (13)$$

As such, for the layers of the multilayer film, it is possible to calculate the physical thickness of each layer from the optical thickness only by inputting the refractive index of each layer in the set wavelength range. Therefore, it is not necessary to know in advance the relationship between the optical thickness and the physical thickness of each layer. As a result, even when a new multilayer film is measured, it is not necessary to input the relational expression between the optical thickness and the physical thickness and modify the film thickness measuring device.

Figure 4:
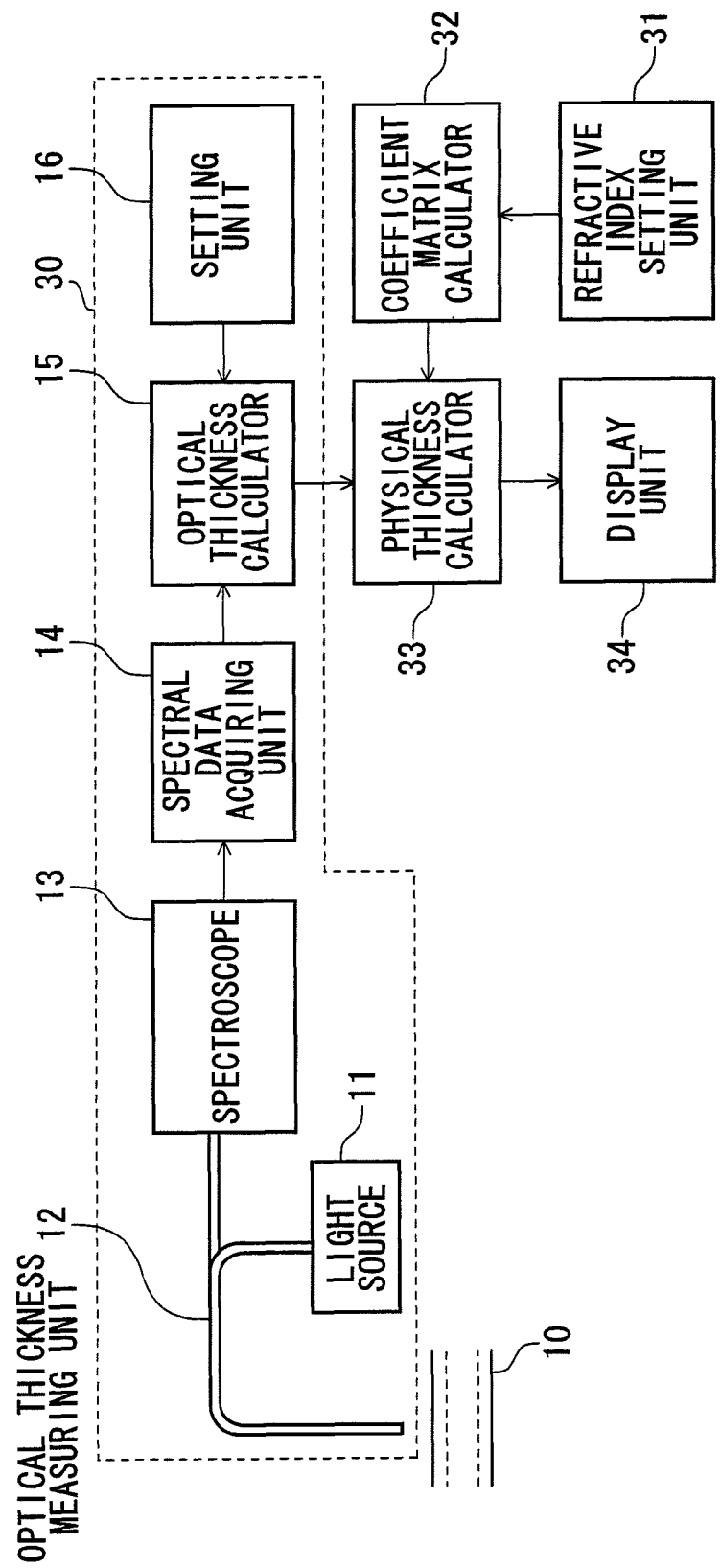
FIG. 4 is a diagram illustrating a multilayer film thickness measuring device according to the embodiment of the invention.
Figure 5:
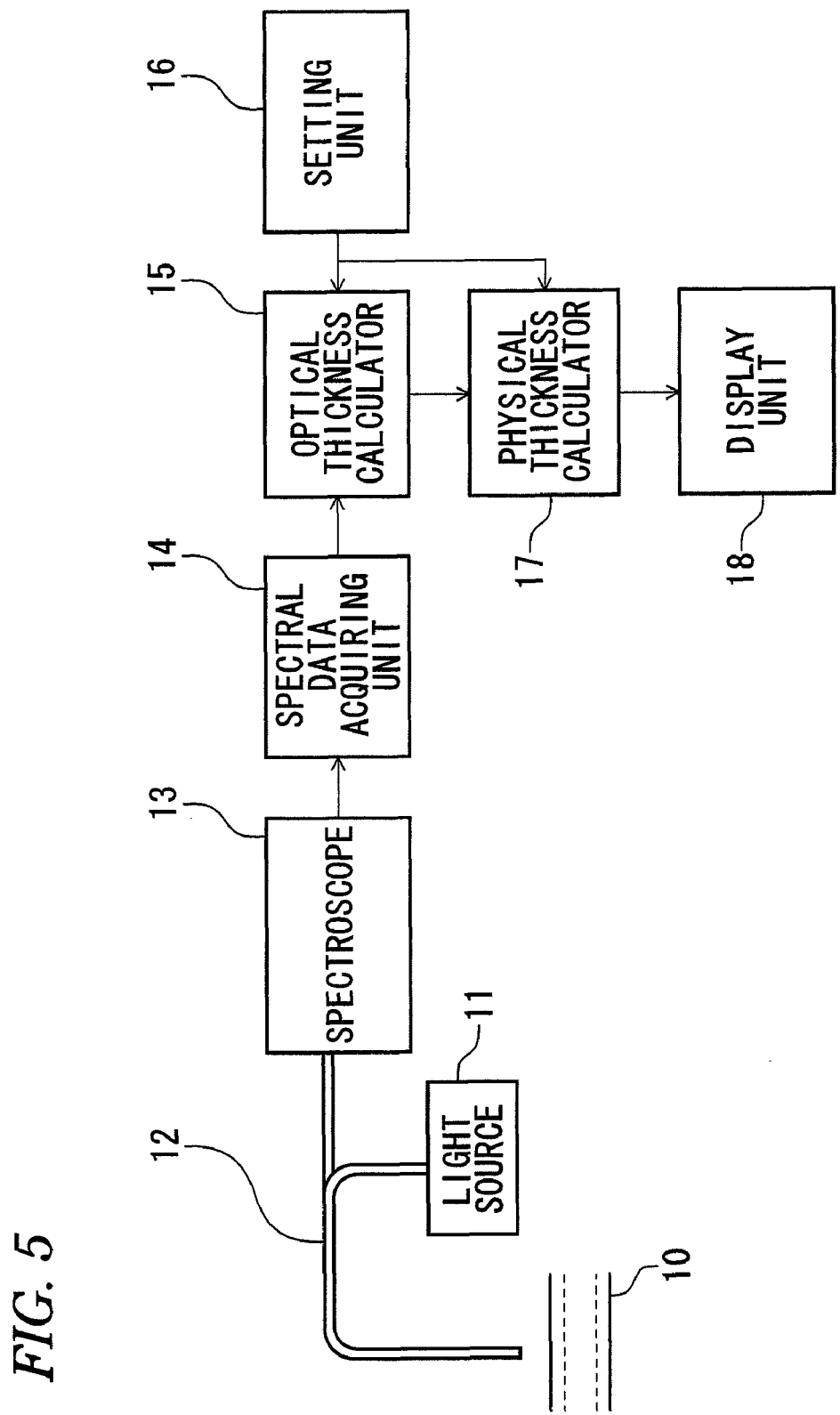
FIG. 5 is a diagram illustrating a film thickness meter in a related art.

FIG. 4 is a diagram illustrating a device for measuring the thickness of a multilayer film according to the embodiment. In FIG. 4, the same components as those in FIG. 5 are denoted by the same reference numerals and a description thereof will be omitted herein.

In FIG. 4, the device includes an optical thickness measuring unit 30, a refractive index setting unit 31, a coefficient matrix calculator 32, a physical thickness calculator 33, and a display unit 34. The optical thickness measuring unit 30 includes a light source 11, an optical fiber 12, a spectroscope 13, a spectral data acquiring unit 14, an optical thickness calculator 15, and a setting unit 16.

White light emitted from the light source 11 is guided to the optical fiber 12 and is provided to the multilayer film 10. Light reflected by the multilayer film 10 is provided to the spectroscope 13 through the optical fiber 12. The spectroscope 13 generates a spectrum of the reflected light. The spectrum is acquired by the spectrum data acquiring unit 14 and is then output to the optical thickness calculator 15.

The setting unit 16 displays the screen shown in FIG. 3A on the display unit 34. The user uses the screen to set a wavelength range for measuring the optical thickness of each layer of the multilayer film and a power spectrum peak search range. The set values are input to the optical thickness calculator 15.

The optical thickness calculator 15 calculates the optical thickness from the input spectrum and set values. The optical thickness calculator 15 converts the spectrum into the wavenumber domain reflectance spectrum in which the wavelength is arranged at equal intervals and performs Fourier transform on the data of the wavenumber domain reflectance spectrum to calculate the power spectrum in the set wavelength band. Then, the optical thickness calculator 15 detects the peak of the power spectrum in the peak detection range set by the setting unit 16 and calculates the optical thickness from the position of the peak.

Reference numeral 31 indicates a refractive index setting unit and displays the screen shown in FIG. 3B or 3C on the display unit 34. The user uses the screen to input the refractive index of each layer of the multilayer film in the wavelength range. The refractive index of the layer that does not relate to the targeted optical thickness is set to 0.0.

The refractive index set by the refractive index setting unit 31 is input to the coefficient matrix calculator 32. The coefficient matrix calculator 32 rearranges the input refractive indexes to generate a matrix, calculates an inverse matrix of the matrix to create a coefficient matrix, and outputs the coefficient matrix to the physical thickness calculator 33.

The physical thickness calculator 33 calculates the physical thickness of each layer based on Expression (13), using the optical thickness measured by the optical thickness measuring unit 30 and the coefficient matrix generated by the coefficient matrix calculator 32, and displays the calculated value on the display unit 34.

When the coefficient matrix is calculated, in some cases, the inverse matrix is not obtained. In this case, it is difficult to obtain the physical thickness from the measured optical thickness. Therefore, in order to obtain the inverse matrix, for example, other measured values of the optical thickness are used and the wavelength range to be measured is changed.

When the inverse matrix is obtained, but the absolute value of each component of the inverse matrix is large, the error of the measured optical thickness increases, which makes it difficult to obtain an accurate physical thickness. Therefore, the value of each component of the inverse matrix is checked, that is, it is checked whether the value is less than a threshold value. In this case, it is possible to stably measure the physical thickness. The threshold value depends on a measurement target or desired measurement accuracy. However, the threshold value may be about ten times the average value of the components.

The device shown in FIG. 4 may further include a monitoring unit that checks each component of the coefficient matrix output from the coefficient matrix calculator 32. The monitoring unit may check the absolute value of each component of the coefficient matrix. When there is a component whose value is the threshold value or more, the monitoring unit may display a warning on the display unit 34.

When the multilayer film is inclined and some boundary surfaces are unclear, the intensity of the reflected light is reduced and the peak of the power spectrum is low. In this case, it may be difficult to accurately measure the optical thickness. Therefore, only when the height of the peak of the power spectrum is a threshold value or more, the optical thickness is output, and when the height is less than the threshold value, an invalid value is output.

When the physical thickness is calculated, the product of the invalid value and 0 is 0, and the product of the invalid value and values other than 0 is an invalid value. In addition, the sum of the invalid value and a certain value is an invalid value. In this way, the physical thickness is calculated. Therefore, the physical thickness calculated using the optical thickness with an invalid value is an invalid value and the physical thickness calculated using only the optical thickness with a valid value is a correct value.

As can be seen from FIG. 3B, the layers in the same wavelength range have the same refractive index. When the screen shown in FIG. 3B or 3C is used, the same value needs to be input several times in order to input the refractive index. Therefore, when a given refractive index is input, the fields to which the same value is input are automatically copied. In this way, it is possible to prevent input errors.

In FIG. 4, light is provided to only one side of the multilayer film. However, as shown in FIG. 1 of JP-A-2008-292473, light may be provided to both sides of the multilayer film. In this case, the optical thickness of each layer is measured using the spectrum measured by the spectrum data acquiring unit 14. In addition, the optical thickness measuring unit 30 may not necessarily have the structure shown in FIG.

4. That is, the optical thickness measuring unit 30 may be configured so as to measure the optical thickness using light reflected from the multilayer film.

The light may not be a visible light. For example, a plurality of light sources 11 and the spectroscope 13 may be used, and the optical thickness may be measured using visible light and infrared rays. When the wavelength range of light provided to the multilayer film is widened and is greatly changed each time the optical thickness is measured, the characteristics of the optical thickness are also changed. Therefore, it is possible to increase the amount of information used for measurement. For example, when light in the visible range is used and the widest possible wavelength range is selected, in many cases, it is possible to reliably measure the optical thickness of a thin layer. Infrared rays may be used to measure the optical thickness of a thick layer with high resolution.

In addition, for example, visible light, X-rays, infrared rays, or radioactive rays may be used, and a sensor may be used to detect the amount of attenuation of light by a multilayer film, which is a measurement target, and measure the film thickness. In this case, the output of the sensor may be used as a pseudo-optical thickness and the sensitivity ratio of the sensor to each layer of the multilayer film may be used as a pseudo-refractive index. Then, the physical thickness may be calculated by Expression (13). In this way, it is possible to accurately measure the physical thicknesses of all layers of the multilayer film that could not be detected by the method of measuring the reflected light.

For example, in a multilayer film obtained by coating a ceramic material onto a transparent plastic film, since the ceramic layer does not allow visible light to pass therethrough, it is difficult to measure the physical thickness using the method of measuring the reflected light.

Accordingly, X-rays are used to measure the physical thickness. The X-rays can pass through the ceramic layer, and the amount of attenuation of the X-rays depends on the physical thickness. Therefore, it is possible to measure the physical thickness. Since the X-rays are hardly attenuated by the plastic film, it may be considered that the physical thickness calculated from the amount of attenuation of the X-rays in the multilayer film is substantially equal to the physical thickness of the ceramic layer.

However, since the X-rays are slightly attenuated in the plastic film, it is difficult to accurately measure the physical thickness of the ceramic layer using the above-mentioned method. In addition, the physical thickness of the plastic film needs to be separately measured.

Therefore, the amount of attenuation of the X-rays is used as a pseudo-optical thickness, and the attenuation ratio of the X-rays in the ceramic layer and the plastic film layer is used as a pseudo-refractive index. Then, the pseudo-optical thickness, the pseudo-refractive index, and the optical thickness and the refractive index of the plastic film measured by the method of measuring the reflected light are substituted into Expression (13) to calculate the physical thickness. In this case, it is possible to correct the influence of the plastic film layer and accurately measure the physical thicknesses of all of the layers.

As described above, the embodiment of the present invention has the following advantages, for example.

First of all, the refractive index of each layer of the multilayer film is set, and the refractive index is used to calculate the coefficient matrix. Then, the physical thickness is calculated using the measured optical thickness and the coefficient matrix.

Even when the number of layers of the multilayer film and the optical thickness to be measured are changed, it is possible to calculate the physical thickness from the optical thickness using the same method. It is possible to measure the physical thickness without knowing in advance the relational expression between the optical thickness and the physical thickness. Therefore, even if the user does not know the relational expression between the optical thickness and the physical thickness, he can perform an accurate measuring operation.

It is not necessary to newly set the relational expression between the optical thickness and the physical thickness even when a measurement target is changed. Therefore, it is not necessary to set a new relational expression or modify a measuring device.

The optical thickness that could not be measured is regarded as an invalid value, and the physical thickness is calculated from the optical thickness considering the invalid value. Therefore, even when there is an optical thickness that could not be measured, it is possible to measure the physical thickness of the layer that does not relate to the optical thickness.

For example, when X-rays, infrared rays, or radioactive rays are used, and a sensor that measures the thickness of a layer from the amount of attenuation of the rays is used to calculate the physical thickness, it is possible to accurately measure the physical thickness.

While the present invention has been shown and described with reference to certain exemplary embodiments thereof, other implementations are within the scope of the claims. It will be understood by those skilled in the art that various changes in form and details may be made therein without departing from the spirit and scope of the invention as defined by the appended claims.

The invention claimed is:

1. A method of measuring a physical thicknesses of respective layers of a multilayer film, based on optical thicknesses of the respective layers, the method comprising:
   (a) setting refractive indexes of the layers;
   (b) obtaining a coefficient matrix by generating a matrix including the refractive indexes and calculating an inverse of the matrix;
   (c) providing light to the multilayer film so as to measure the optical thicknesses based on the light reflected by the multilayer film; and
   (d) calculating the physical thicknesses, by multiplying the optical thicknesses and the coefficient matrix.

2. The method according to claim 1, wherein when at least one of the optical thicknesses that cannot be measured in step (c) is set as an invalid value, the product of the invalid value and 0 is set to 0, the product of the invalid value and a certain value other than 0 is set to the invalid value, and the sum of the invalid value and the certain value is set to the invalid value.

3. The method according to claim 1, further comprising:
   (e) setting an attenuation amount of the light entering the multilayer film as pseudo-optical thicknesses of the respective layers of the multilayer film; and
   (f) using an attenuation ratio of the light in the respective layers as pseudo-refractive indexes of the respective layers of the multilayer film, and
   wherein step (b) comprises: obtaining the coefficient matrix by generating the matrix including the pseudo-refractive indexes and the refractive indexes and calculating an inverse of the matrix, and wherein step (d) comprises: calculating the physical thickness, multiplying the pseudo-optical thickness as well as the optical thickness and the coefficient matrix.

4. A device that measures physical thicknesses of respective layers of a multilayer film, based on optical thicknesses of the respective layers, the device comprising:
   an optical thickness measuring unit configured to provide light to the multilayer film so as to measure the optical thicknesses based on the light reflected by the multilayer film;
   a refractive index setting unit configured to set refractive indexes of the respective layers;
   a coefficient matrix calculator configured to obtain a coefficient matrix by generating a matrix including the refractive indexes and calculating an inverse of the matrix; and
   a physical thickness calculator configured to calculate the physical thicknesses by multiplying the optical thicknesses and the coefficient matrix.

5. The device according to claim 4, further comprising:
   a monitoring unit configured to monitor an absolute value of each component of the coefficient matrix and output warning when the absolute value is more than a threshold value.

6. The device according to claim 4, wherein when at least one of the optical thicknesses that cannot be measured by the optical thickness measuring unit is set as an invalid value, the product of the invalid value and 0 is set to 0, the product of the invalid value and a certain value other than 0 is set to the invalid value, and the sum of the invalid value and the certain value is set to the invalid value.

7. The device of claim 1, wherein the matrix consists of the refractive indexes.

8. The device of claim 3, wherein the matrix consists of the pseudo-refractive indexes and the refractive indexes.

* * * * *